United States Patent
Gandhi

(10) Patent No.: US 10,469,341 B2
(45) Date of Patent: Nov. 5, 2019

(54) INTELLIGENT CONNECTION MANAGEMENT FOR MULTIPLE INTERFACES

(71) Applicant: Microsoft Technology Licensing, LLC, Redmond, WA (US)

(72) Inventor: Dhiraj Pramod Gandhi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/794,249

(22) Filed: Oct. 26, 2017

(65) Prior Publication Data
US 2019/0132219 A1    May 2, 2019

(51) Int. Cl.
*H04L 12/24*    (2006.01)
*H04L 12/26*    (2006.01)
(Continued)

(52) U.S. Cl.
CPC ...... *H04L 41/5038* (2013.01); *H04L 12/5692* (2013.01); *H04L 41/5003* (2013.01);
(Continued)

(58) Field of Classification Search
CPC ....... H04L 41/04; H04L 41/085; H04L 41/12; H04L 45/02; H04W 84/18
See application file for complete search history.

(56) References Cited

U.S. PATENT DOCUMENTS

| | | | |
|---|---|---|---|
| 5,548,579 A * | 8/1996 | Lebrun | H04L 12/433 370/431 |
| 5,892,754 A * | 4/1999 | Kompella | H04L 47/10 370/236 |

(Continued)

FOREIGN PATENT DOCUMENTS

| | | |
|---|---|---|
| EP | 2429237 A1 | 3/2012 |
| EP | 2706790 A1 | 3/2014 |
| WO | 2006055784 A2 | 5/2006 |

OTHER PUBLICATIONS

King, Bertel, "How to Prevent Any App from Using Mobile Data on Android", Published on: Dec. 4, 2015 Available at: http://www.makeuseof.com/tag/prevent-any-app-using-mobile-data-android/ (6 pages total).
(Continued)

*Primary Examiner* — Sharad Rampuria
(74) *Attorney, Agent, or Firm* — Mark K. Young; Mayer & Williams PC

(57) ABSTRACT

A computing device supports multiple different network interfaces providing respective connections to, for example WiFi, short-range and near field communication (NFC), and mobile data (e.g., cellular) networks, over which bandwidth-consuming applications may operate. An operating system (OS) instantiated on the computing device supports a connection manager configured to dynamically and concurrently optimize utilization of the available network connections across the executing applications to provide seamless user experiences on the device while meeting various user objectives. These objectives may include, for example, maximizing device battery life, minimizing costs associated with use of mobile data plans and other metered network connections, minimizing glitches, data buffering, and disruptions (e.g., when streaming multimedia, downloading files, and engaging in real-time communications like voice
(Continued)

and video calls), and transparency of operation as the diverse network connections are utilized.

19 Claims, 14 Drawing Sheets

(51) Int. Cl.
    *H04L 12/707*     (2013.01)
    *H04L 29/08*     (2006.01)
    *H04W 88/06*     (2009.01)
    *H04L 12/54*     (2013.01)

(52) U.S. Cl.
    CPC ........ *H04L 43/087* (2013.01); *H04L 43/0811* (2013.01); *H04L 43/0829* (2013.01); *H04L 45/22* (2013.01); *H04L 67/22* (2013.01); *H04W 88/06* (2013.01)

(56) References Cited

U.S. PATENT DOCUMENTS

| | | | |
|---|---|---|---|
| 6,141,686 A * | 10/2000 | Jackowski | H04L 41/065 709/206 |
| 6,192,414 B1 | 2/2001 | Horn | |
| 7,633,942 B2 * | 12/2009 | Bearden | H04L 41/0213 370/392 |
| 9,078,123 B1 | 7/2015 | Benco et al. | |
| 2005/0254435 A1 | 11/2005 | Moakley et al. | |
| 2006/0193295 A1 * | 8/2006 | White | H04L 12/5692 370/336 |
| 2010/0008291 A1 | 1/2010 | Leblanc et al. | |
| 2011/0039529 A1 | 2/2011 | Kim et al. | |
| 2013/0044603 A1 * | 2/2013 | Macias | H04W 48/18 370/241 |
| 2013/0205366 A1 | 8/2013 | Luna et al. | |
| 2013/0229270 A1 | 9/2013 | Srinivasan et al. | |
| 2013/0288656 A1 | 10/2013 | Schultz et al. | |
| 2014/0330990 A1 | 11/2014 | Lang et al. | |
| 2015/0085823 A1 | 3/2015 | Jain | |
| 2015/0163811 A1 | 6/2015 | Konstantinou et al. | |

OTHER PUBLICATIONS

"About cellular data settings and usage on your iPhone and iPad", Published on: Nov. 10, 2014 Available at: https://support.apple.com/en-us/HT201299 (3 pages total).

"International Search Report and Written Opinion Issued in PCT Application No. PCT/US2018/055766", dated Jan. 8, 2019, 13 Pages.

* cited by examiner

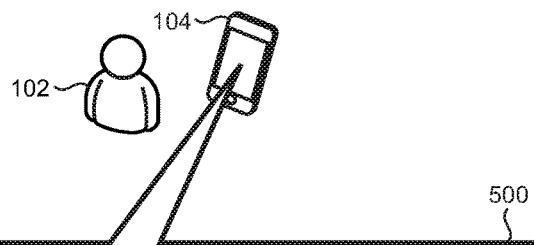

FIG 5

Network Connection Manager — 502

505 — Let Connection Manager automatically manage your network connections ■

Connect to a network to

515 — Provide highest quality experiences (e.g., for streaming media, for voice and video calls) ☐

520 — Minimize costs for metered connections (e.g., cellular data connections) ☐

525 — Maximize battery life ☐

Let me choose the network for each application

530 — When an application is launched ☐

535 — When an application needs to access background data ■ — 504

540 — Notify me when network connectivity changes ☐

545 — Notify me when my preferred network connection is unavailable ☐

506 — Remember my connection preferences ☐

508 — Monitor my network choices (to help improve connection management) ☐

510 — Utilize multiple connections (Wi-Fi and cellular) (default is single connection) ☐

500

INTELLIGENT CONNECTION MANAGEMENT FOR MULTIPLE INTERFACES

BACKGROUND

Computing devices typically engage in communications with other computing devices and services to perform their intended functions and/or to enhance their utility.

SUMMARY

A computing device such as a smartphone, tablet, laptop personal computer (PC), wearable computing device, media player, and the like supports multiple different network interfaces providing respective connections to, for example WiFi, short-range and near field communication (NFC), and mobile data (e.g., cellular) networks, over which bandwidth-consuming applications may operate. An operating system (OS) instantiated on the computing device supports a connection manager configured to dynamically and concurrently optimize utilization of the available network connections across the executing applications to provide seamless user experiences on the device while meeting various user objectives. These objectives may include, for example, maximizing device battery life, minimizing costs associated with use of mobile data plans and other metered network connections, minimizing glitches, data buffering, and disruptions (e.g., when streaming multimedia, downloading files, and engaging in real-time communications like voice and video calls), and transparency of operation as the diverse network connections are utilized.

Each of the network connections available to the computing device may provide different levels of quality of service (QoS), for example as measured by bandwidth, packet loss, jitter, latency, cost, etc., depending on contextual factors such as device location, time of day, and the like. Applications can register their QoS requirements with the connection manager which can vary by application feature and context. For example, a real-time communication feature of an application may require a higher QoS relative to an asynchronous file-sharing feature or background operation of that application. In addition, applications can be categorized by type and the connection manager can determine QoS requirements for an application based on its type.

The connection manager may also determine QoS requirements implicitly by observing the behavior of an application, including its interactions with the user, during application execution. Different network connections can be iteratively tested to determine how the application behaves with each connection. For example, the connection manager can test an initial network connection having a lower QoS and observe whether the application is still able to effectively render its user experience and perform its intended functions with the lower QoS connection. If, for example, the user experience is disrupted, or if the application surfaces a notification indicating that data is being buffered, or that the current connection is insufficient to support the feature, then the connection manager can test another network connection with a higher QoS and observe application behavior over that connection.

A computing device user can explicitly express objectives and preferences for network connection management through a user interface (UI). The user may also opt in to automated monitoring of behaviors and interactions with the device so that preferences can be determined implicitly. For example, the user might express a preference to use the lowest cost connection whenever possible while maintaining a suitable QoS for a particular music-streaming application. In another example, the connection manager may observe the frequency of application usage and give connection priority to the user's favored and/or more frequently utilized applications.

During computing device operation, the connection manager is configured to monitor the QoS for each of the available network connections and dynamically allocate network connection utilization in an optimized manner across all of the bandwidth-consuming applications that are executing on the device. The connection manager can select a single network connection for an application for a given time period, gracefully switch among different network connections, or use multiple network connections at the same time. The selection and switching is typically performed in a manner that is seamless and transparent to the user and applications. In some implementations, network connection management can be exposed to the user through the UI to obtain user feedback as to the effectiveness of a particular network connection allocation methodology or algorithm.

In addition to application requirements and user preferences, the connection manager can consider contextual data (e.g., obtained from device sensors, manual user input, and other sources), current application state (such as whether an application has focus and is consuming user inputs, is operating in background, is idle, etc.), as well as past user behaviors and application usage history, when determining an optimal allocation for network connections among the applications. Thus, the connection manager can both react to changes in context, user behaviors, and application behaviors, as well as make predictions as to optimal network connection allocation and then take proactive steps to ensure that objectives are achieved and the quality of user experiences is maximized in view of applicable context.

In some implementations, the connection manager can interoperate with remote (e.g., cloud-based) services when performing the network connection management on a local device. The service can provide various data and resources and perform various operations, such as application identification and categorization, and also engage remote processing to perform all or part of the optimized network connection management. In addition, the service can aggregate data from groups of users and devices (i.e., crowd-sourcing) as part of a learning loop to improve the effectiveness of the network connection management methodologies and algorithms.

The present intelligent network management for multiple interfaces is configured to improve the technical operations of the computing device by managing resources that are often limited such as battery power, processing cycles, memory, and network bandwidth. In addition, many mobile data plans do not provide unlimited data to subscribers, so users are typically motivated to use mobile data connections within their allotted data limits. Computing device operations may be optimized for a resource-efficient user experience by identifying application QoS requirements and user preferences and then responsively managing network interfaces and connections to ensure more optimal utilization of available network connections.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIG. 5 shows an illustrative user interface (UI) that may be exposed on a computing device;

Like reference numerals indicate like elements in the drawings. Elements are not drawn to scale unless otherwise indicated.

DETAILED DESCRIPTION

Figure 1:
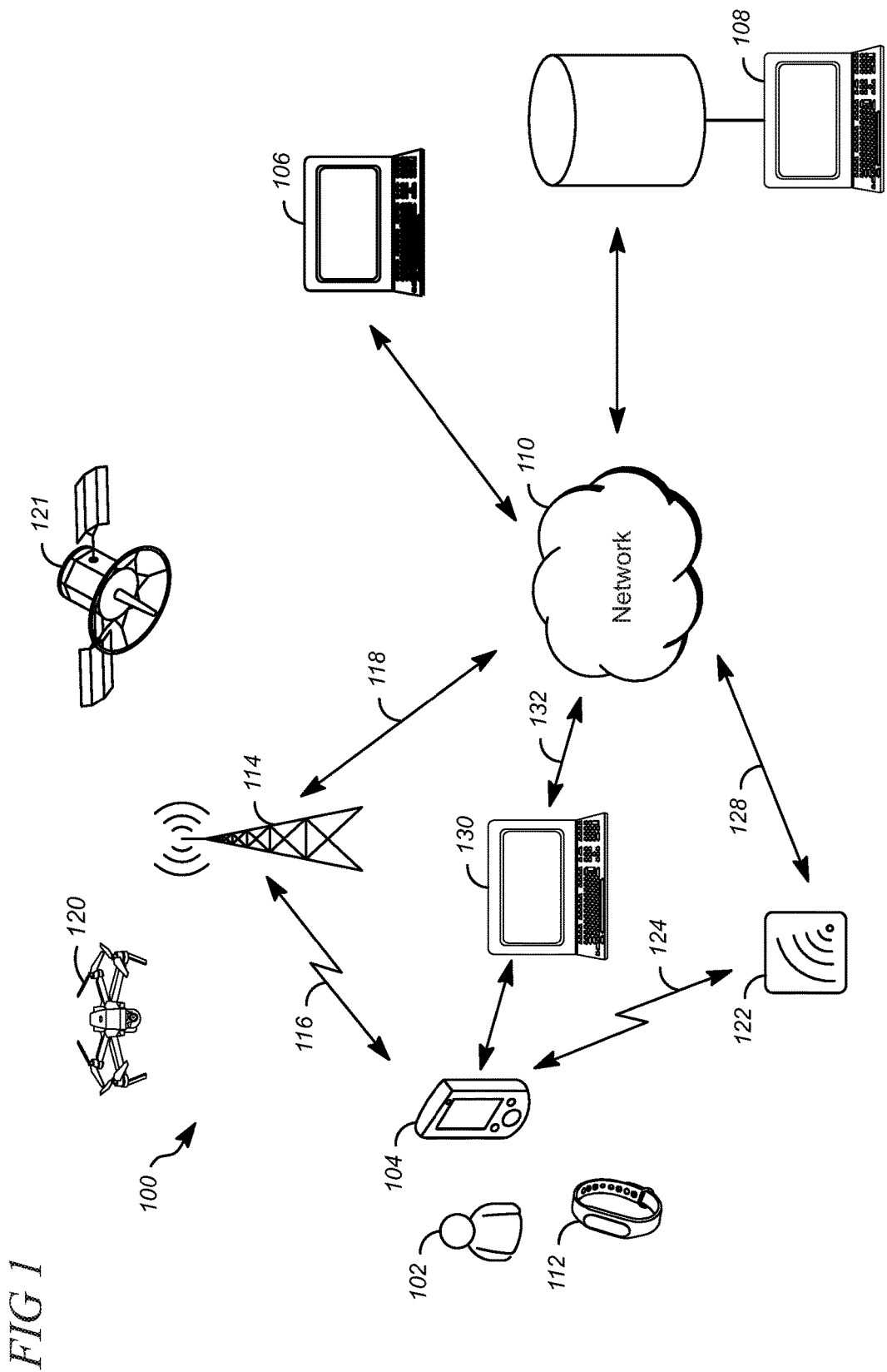
FIG. 1 shows an illustrative computing environment in which computing devices supporting multiple network interfaces can communicate and interact with various devices or services over a network.

FIG. 1 shows an illustrative computing environment 100 in which a user, $102_1, 102_2 \ldots 102_n$, individually $102_i$ and generally or collectively 102, may employ a respective computing device, $104_1, 104_2 \ldots 104_n$, individually $104_i$ and generally or collectively 104. Each device $104_i$ can communicate with other devices 104, or remote devices 106 or 108, to access various services over a network 110. Each of devices 104 can support telephony capabilities (e.g., voice and/or video) in some cases and typically support data-consuming applications such as Internet browsing and multimedia (e.g., music, video, etc.) consumption in addition to various other features.

The computing devices 104 may include, for example, user equipment, mobile phones, cell phones, feature phones, tablet computers, and smartphones which users often employ to make and receive voice and/or multimedia (e.g., video) calls, engage in messaging (e.g., texting) and email communications, use applications and access services that employ data, browse the World Wide Web, and the like. Other types of computing devices are optionally usable within the environment 100 including handheld computing devices, PDAs (personal digital assistants), media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), desktop computers, multimedia consoles, gaming systems, or the like. In the discussion that follows, the use of the term "device" is intended to cover all computing devices that are configured with communication capabilities and are capable of connectivity to the network 110.

The various computing devices 104 in the environment 100 can support different features, functionalities, and capabilities (here referred to generally as "features"). Some of the features supported on a given device $104_i$ can be similar to those supported on other devices 104, while other features may be unique to a given device. The degree of overlap and/or distinctiveness among features supported on the various devices 104 can vary by implementation. For example, some computing devices 104 can support touch controls, gesture recognition, and voice commands, while others may enable a more limited user interface. Some devices may support video consumption and Internet browsing, while other devices may support more limited media handling and network interface features. Computing device 104 can include mobile and portable devices, as well as devices that are typically utilized in a fixed location.

Accessory devices 112, such as wristbands and other wearable computing devices may also be present in the environment 100. An accessory device 112 is typically adapted to interoperate with a coupled device $104_i$ using a short range communication protocol like Bluetooth to support functions such as monitoring of the wearer's fitness and/or physiology (e.g., heart rate, steps taken, calories burned, etc.) and environmental conditions (temperature, humidity, ultraviolet (UV) levels, etc.), and surfacing notifications from the coupled device $104_i$. Some accessory devices 112 can be configured to work on a standalone basis (i.e., without relying on a coupled device 104 for functionality such as Internet connectivity) as wearable computing devices that may support an operating system and applications. Thus, an accessory device 112 generally can be considered as a specialized form of computing device 104.

The devices 104 can typically utilize the network 110 to access and/or implement various user experiences. The network 110 can include any of a variety of network types and network infrastructure in various combinations or sub-combinations. An illustrative network connection between the devices 104 and the network 110 includes one or more cellular networks, in which the devices 104 are in radio communication 116 with a fixed terrestrial station 114 to support cellular voice and/or cellular data. Fixed terrestrial station 114 in turn has its own communication path 118 to the network 110. A computing device 104 may in some implementations communicate with the network 110 via one or more aircraft 120, and/or satellites 121, by way of supplement or substitution for communication with the terrestrial station 114.

Computing devices 104 may be in communication with one or more IP (Internet-Protocol) networks using a network connection to a wireless access point 122, which the devices communicate with via wireless protocol 124, for example as described under IEEE 802.11. The access point 122 in turn has its own communication path 128 to the network 110. In certain implementations, the devices 104 may have access to a wired network switch 130, for example as described by IEEE 802.3, by way of temporary or momentary wired connection, as in a docking station or the like. The network switch 130 in turn has its own communication path 132 to the network 110. In some implementations, the network switch 130, and its respective communication path 132, can be arranged to form part of the communication path 128 that supports wireless access point 122.

Other network connections between the computing devices 104 and the network 110 may include a public switched telephone network (PSTN), either independently or as part of the cellular network described above (including terrestrial stations 114) and/or short range networks such as Bluetooth and NFC networks. The network infrastructure can be supported, for example, by mobile operators, enterprises, Internet service providers (ISPs), telephone service providers, data service providers, and the like.

The network 110 may utilize portions of the Internet or include interfaces that support a connection to the Internet so that the devices 104 can access content and render user experiences provided by various remote or cloud-based application services and websites. The application services and websites can support a diversity of features, services, and user experiences such as social networking, mapping, news and information, entertainment, travel, productivity, finance, etc. The remote application services and websites can interact with corresponding local components that are stored and which execute on a given device including applications and web browser, as discussed below.

Figure 2:
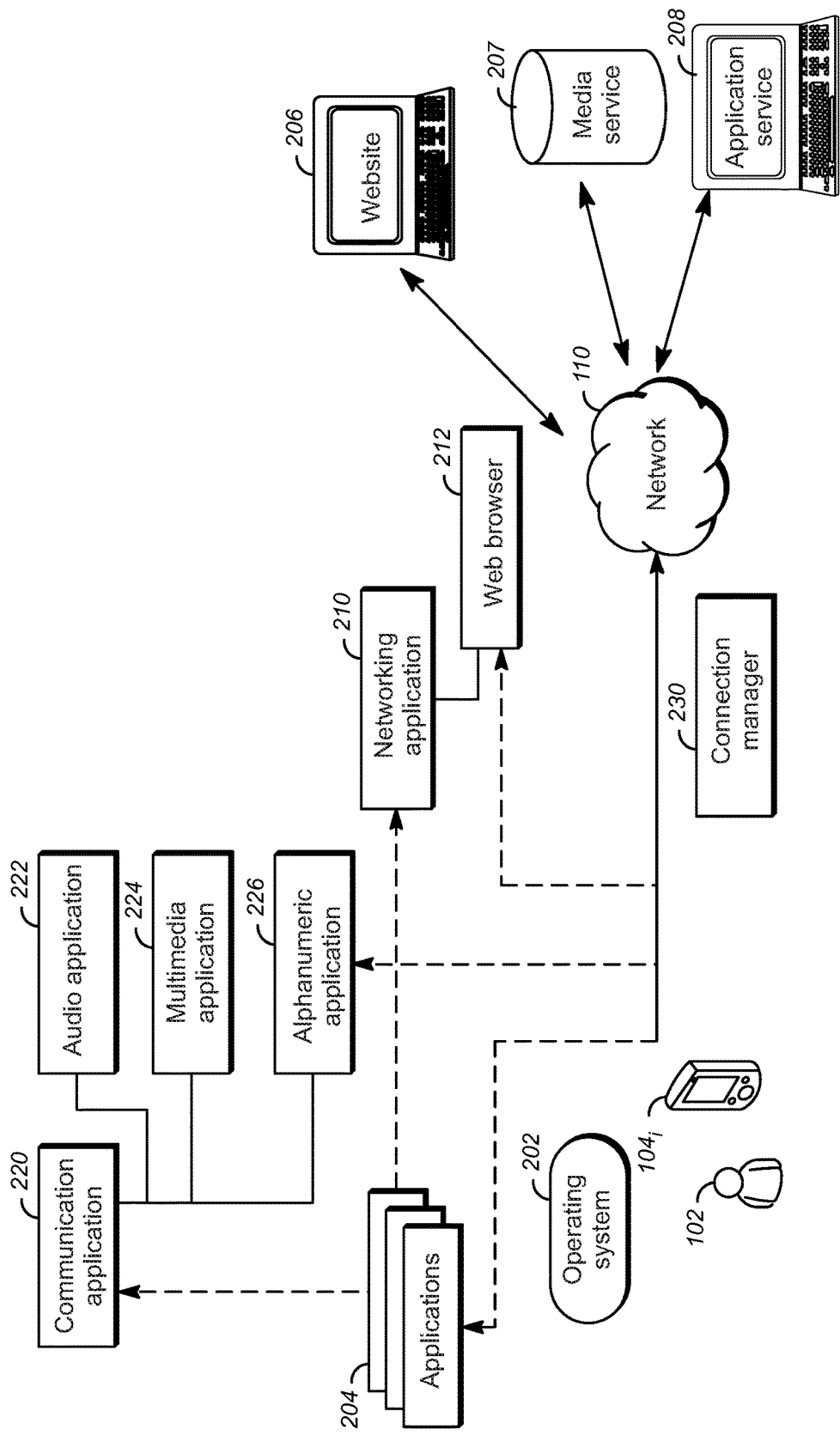
FIG. 2 shows a computing device including multiple applications which interact with other devices over the network.

As shown in FIG. 2, a computing device $104_i$ can include local components such as operating system 202 and/or one or more applications 204 that are configured to consume network bandwidth. For example, applications 204 can include networking applications 210, one example of which can be a web browser 212. Others of applications 204 may include communication applications 220, among which may include audio communication application 222, multimedia communication application 224, and alphanumeric communication application 226. Such communication applications 220 described above are exemplary, and not limiting. Furthermore, such applications need not be exclusive of one another, or of any other of applications 204. A given application may be integrated, in whole or in part, with any other application, as may be appropriate.

Networking applications 210, such as web browser 212, can facilitate interaction with one or more websites 206 and/or remote application services 208. In some use scenarios, users 102 may launch a locally executing networking application 210 like a web browser 212. The networking application 210 can communicate over the network 110 to a media service 207 and/or an application service 208 in order to retrieve data and obtain services to enable various features and functions, provide information, and/or support user experiences that can be supported on various ones of the user interfaces on a local device 104 such as graphical user interfaces (GUIs) and audio user interfaces. In some use scenarios and/or at different times, an application 204, including networking applications 210 may operate locally on the device 104 without needing to interface with a remote service.

The operating system 202 may further be operative to manage communication traffic between the device $104_i$ and the network 110. This traffic management function is illustratively performed by a connection manager 230. The connection manager may be incorporated within, or implemented as any of a function of the operating system, whether integrally or separate therefrom, or implemented in whole or part in one or more of the applications. If implemented as an application, the connection manager may be considered as a separate kind of application as it manages the communication between certain ones of the network-employing applications and the network itself.

The connection manager 230 may be implemented to dynamically optimize utilization of the available network connections across all of the executing applications to provide a seamless user experience on the device while achieving various user objectives with respect to the computing devices 104. The optimization may be performed continuously or periodically. Illustrative objectives may include maximization of device battery life, minimization of costs associated with particular communication channels to the network 110, e.g., mobile data plan usage, and improving the quality of user experience with various bandwidth-consuming applications 204, e.g., by minimizing glitches and disruptions in the communication channel. Effective network connection management is typically desirable, in some cases, because certain applications and features supported therein may not operate properly unless supported by a connection that provides a suitable Quality of Service (QoS). Improper operation can include, for example, disruptions to the quality of a given user experience, glitches and hanging application operations, incomplete data transfers, and the like. In some cases, operations may need to be restarted to be properly performed. Thus, improper operations caused by ineffective network connection management may consume additional resources such as processor cycles, memory, and battery charge, which can often be scarce.

Figure 3:
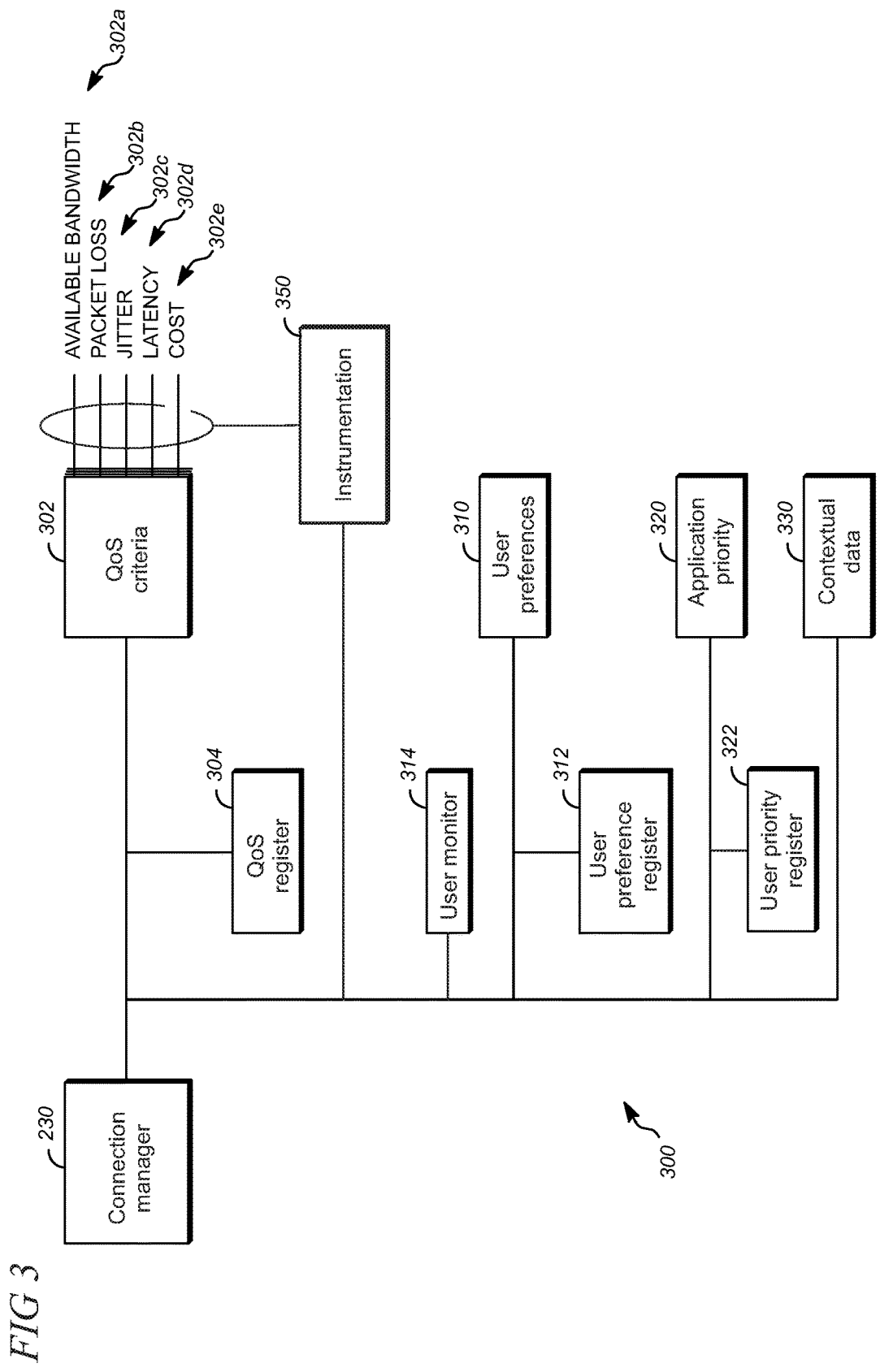
FIG. 3 depicts illustrative criteria utilized by a connection manager in its management of multiple network interfaces.

Referring now to FIG. 3, illustrated are some of the criteria 300 utilized by connection manager 230 in its management of multiple network connections e.g., 116, 118, 124, 128, et al. between the devices 104 and the network 110. According to a first criterion 302, the connection manager 230 considers QoS for each available network connection. Elements that define the QoS may be measurable by instrumentation 350 on the computing device 104, either in real time, continuously, or on a periodic basis. The measurements may be stored in a QoS register 304 that may be utilized by the connection manager 230 in determining which network connections to utilize and/or allocate to which of various bandwidth-consuming applications. Alternatively, QoS criteria measurements may be made elsewhere in the computing environment 100, in which measurements may be provided to the device 104 and/or connection manager 230 periodically, and may also be stored in a QoS register 304.

Among the elements that define a QoS for a given network connection are quantity of bandwidth available $302a$, packet loss (absolute and/or ratio) in transmission $302b$, jitter $302c$, latency $302d$, and cost of transmission $302e$. Cost of transmission $302e$ may be expressed, for example, per time a given network connection is open and available, and/or per quantity of data transmitted. These QoS criteria 302 are illustrative, and not limiting. These and other QoS criteria 302 may vary for each of the available network connections under management, depending on contextual factors such as device 104 location and time of day, among others.

Various bandwidth-consuming applications 204 may register their QoS requirements with the operating system 202 and/or the connection manager 230. Application QoS requirements may be stored for connection manager 230 use in the QoS register 304. The QoS requirements for each application 204 may also vary by application feature. For example, a real-time communication feature of a multimedia communication application 224 may require a higher QoS than an asynchronous file-sharing feature. Applications 204 can be categorized by type, the application type being stored in QoS register 304. The operating system 202 and/or connection manager 230 can infer network requirements for a given application 204 based on its assigned type categorization. In addition, the operating system 202 and/or connection manager 230 may infer network QoS requirements for any given application 204 by observing the behavior of such application over time.

An illustrative criterion 300 useable by the connection manager 230 may be a user-specified preference 310. In certain implementations, one or more users 102 can explicitly express objectives and preferences for network connection management, for example through a user interface (UI) of the device 104, as shown in FIG. 5 and described in the accompanying text. Such user preference data may be stored for use in a user preference register 312.

In some implementations, one or more users 102 may opt in to automated monitoring of behaviors and interactions with the device 104 by user monitor 314. User preferences 310 can be determined implicitly from the monitoring. For example, the user 104 might express a preference to use the lowest cost network connection whenever possible, while maintaining some minimal QoS for a particular music-streaming application, and also preserving battery life as long as possible.

An illustrative criterion 300 useable by the connection manager 230 may be an application priority 320. In some implementations, one or more users 102 can explicitly express priority for network access between certain applications 204, for example through a user interface (UI) of the computing device 104. Such user priority data may be stored for use in a user priority register 322. In some implementations, a user 104 may opt in to an application priority scheme developed by a third party, such as a manufacturer and/or distributor of application software, or of the computing devices 104.

In other implementations, a user 104 may opt in to automated monitoring of behaviors and interactions with the device 104 by a user monitor 314. Thereafter, the operating system 202 and/or connection manager 230 may observe the frequency of usage for a particular application 204, and give connection priority to the user's favorite and/or most frequently used applications. In some implementations, application priority criterion 320 may alternatively be viewed as a subset of the user preference criterion 310. Regardless of how application priority is determined, an assigned priority associated with an application can be used by connection manager 230 to manage and arbitrate competing network demands.

The connection manager 230 may be configured with context-awareness in which contextual data 330 obtained from device sensors, manual inputs from the user through a UI on the computing device, and other sources may be utilized when performing intelligent connection management. Contextual data is information that provides relevant context about a person (e.g., the user), an entity (e.g., one or more devices), or an event. Contextual data can also describe the physical environment surrounding the computing device and/or user and further characterize interaction between users, applications on the device, and the surrounding environment.

Contextual data can be collected using one or more sensors in a sensor package on a device that is configured to sense and analyze data about the user or environmental surroundings. Sensors in the sensor package may include, for example, camera, accelerometer, location-awareness component, thermometer, altimeter, heart rate sensor, barometer, microphone, or proximity sensor, as described in more detail in the text below accompanying FIGS. 12, 13, and 14. Contextual data can also be collected applications available to the computing device, and also from stored data that is associated with a person, entity, or event.

Contextual data can include, for example, time/date, the user's location, speed, acceleration, and/or direction of travel, environmental conditions (e.g., altitude, temperature, barometric pressure), user's physiological state, language, schedule, applications installed on the device, the user's preferences, the user's behaviors (in which such behaviors may be monitored/tracked with notice to the user and the user's consent), stored contacts (including, in some cases, links to a local user's or remote user's social graph such as those maintained by external social networking services), call history, messaging history, browsing history, computing device type, device capabilities, communications network type and/or features/functionalities provided therein, mobile data plan restrictions/limitations, data associated with other parties to a communication (e.g., their schedules, preferences, etc.), and the like.

Further illustrative examples of contextual data include a current application state, e.g., if an application has focus on the device 104 and is running in the foreground, communication traffic to and from that application—while it remains in the foreground—may be afforded additional bandwidth and/or a higher QoS connection. Conversely, while the same or another application is running in the background, bandwidth and/or higher QoS connections may be diverted to other applications or application features. Contextual data 330 relevant to network connection QoS may also include data such as a location of the mobile device 104. Location data may be derived from GNSS (Global Navigation Satellite System) sensors, where available, and/or by triangulation to known terrestrial stations, among other methodologies.

An application that is idle may be afforded fewer communication resources and network connections with lower QoS by the connection manager 230. In addition, contextual data 330 may be derived from past user behaviors and/or application usage history, when determining an optimal allocation for network connections among the applications. Thus, the connection manager 230 can both react to changes in context, user behaviors, and application behaviors, as well as make predictions as to optimal network connection allocation and then take proactive steps to ensure that the user experience is the best possible and that user objectives are achieved.

Figure 4:
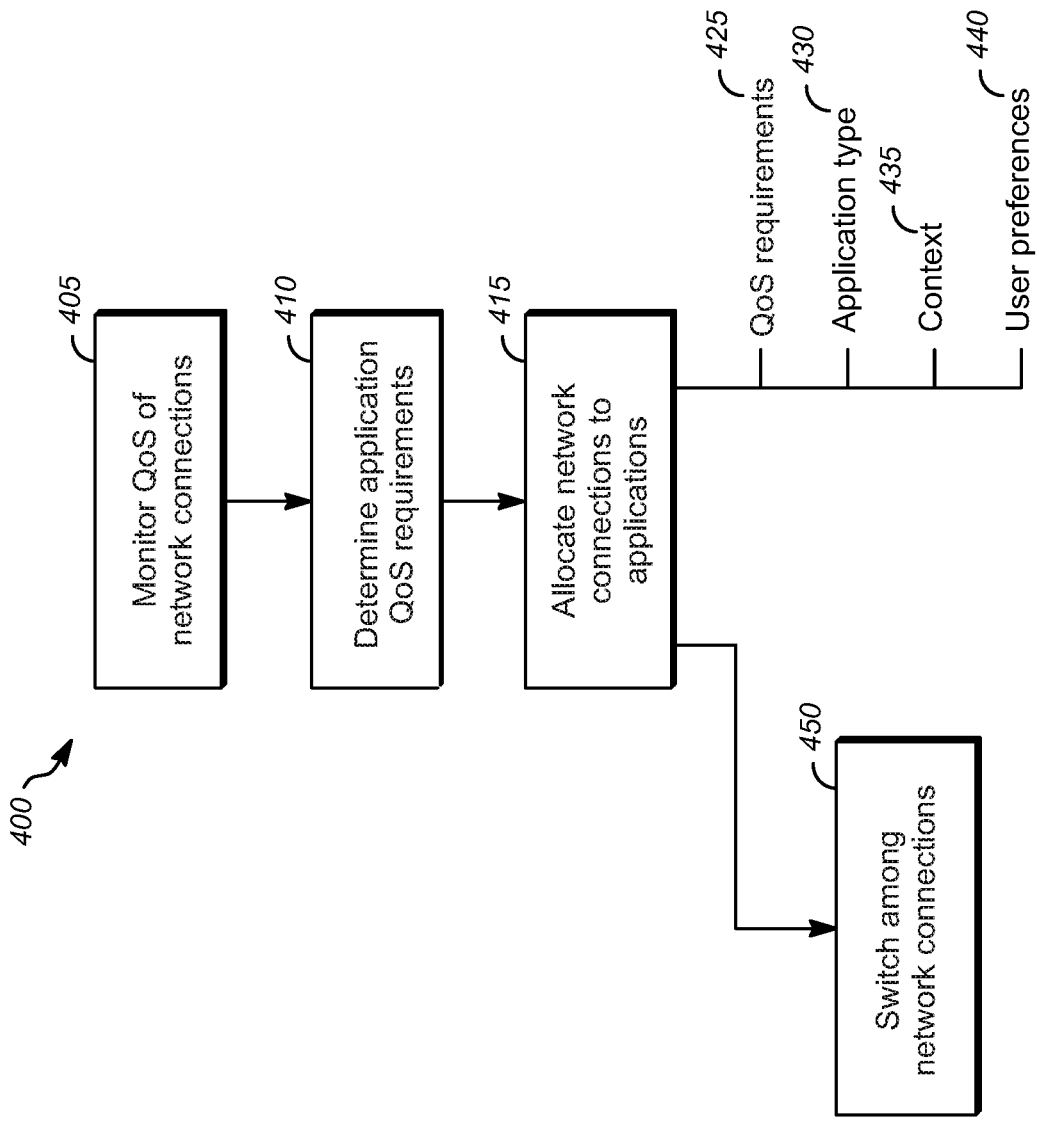
FIG. 4 is a flowchart that show illustrative operations of the connection manager.

FIG. 4 is a flowchart 400 that shows additional details of the operation of the connection manager 230 (FIG. 2). During computing device use, as shown in block 405, the connection manager 230 can monitor the QoS for each of the available network connections, according to the previously discussed QoS criteria 302, or other supplied criteria. At block 410, QoS requirements can be determined per application, or per application feature.

At block 415, network connections are dynamically allocated by the connection manager to any of the bandwidth-consuming applications in an optimized manner across all of the applications that are being executed on the computing device. The allocation may be performed based on QoS requirements 425, application type 430, relevant context 435, and user preferences 440, for example.

At block 450, the connection manager can select a single network connection for an application for a given time period, switch among different network connections, or use multiple network connections at the same time. The selection and switching may be performed by connection manager 230 in a manner that is transparent to the user and applications 204. However, in an alternative implementation, network connection management can be exposed to the user, for example through a UI. The connection manager 230, including display of connection management information to the user, can further optionally solicit user feedback, such as to the effectiveness of a particular network connection allocation methodology, or algorithm. For example, both explicit and implicit user feedback regarding the effectiveness of network connection management actions may be utilized to improve automated network connection selection in subsequent actions.

In some implementations, the connection manager 230 may be configured to interoperate with a remote service (e.g., cloud-based) when performing the network connection management on a local device 104. The remote service can provide various resources, such as application identification and categorization, as discussed above, and also perform remote processing to perform all or part of the optimized network connection management. In addition, the service can aggregate data from groups of users 102 and devices 104 (i.e., crowd-sourcing). This aggregate data can be employed by individual computing devices 104*i* and/or users 102*i* to improve the effectiveness of the connection manager 230 on each device 104*i* to a greater extent than any single device 104*i* could using only data that it could collect without collaboration across multiple devices.

FIG. 5 shows an illustrative user interface (UI) 500 that may be exposed on a computing device 104 and which is arranged to enable a user to manage network connections using a connection manager functionality. The UI 500 may be configured for the user 102 to interact with the device using, for example, voice, sensed gestures, and/or physical interactions such as touch inputs to a touchscreen or through interactions with manual controls such as buttons, keyboards, mice and other input devices, and the like.

The UI 500 is configured in this illustrative example to enable the computing device user to express objectives and preferences for network connection management (illustrative user selections are shown using the filled in squares 502 and 504 in FIG. 5). As shown, the user can select a control 505 so that network connections are automatically managed for the user. The UI 500 can also expose controls 506 and 508 for the user to opt in to automated monitoring by the connection manager 230 of behaviors and interactions with the device 104 so that some user preferences can be determined implicitly.

In this illustrative example, the UI 500 is configured to enable the user to select objectives to be optimized, including providing highest quality user experiences 515, minimizing costs for metered connections 520 (e.g., cellular data), and maximizing battery life 525. In some implementations, the UI 500 may be configured to enable the user to select multiple objectives at the same time. In such case, the connection manager 230 (FIG. 2) may operate to simultaneously optimize network connection selection and utilization across the multiple objectives.

Optimization may include managing conflicts among competing objectives using tie-breaker and other analytic methodologies that utilize, for example, the user's network connection history, observed behaviors and actions of the user, relevant contextual data (e.g., data describing location and time of day, data from device sensors, etc.), data associated with social networking and other applications, and the like. Such methodologies are typically configured to select and apply suitable weight to particular objectives to thereby provide network connection management that is optimized across all the user's objectives. The selected and applied weighting can dynamically vary as context, behaviors, and other relevant conditions change.

The UI 500 can be configured to expose manual controls to enable a user to select a particular network connection on an application-by-application basis. For example, as shown, the user can select a network connection for an application when it is launched 530, and when an application needs to access remote data for background processing 535. As some applications and services do not always work as expected without background data, the manual control 535 gives the user an ability to manage application behaviors with precision.

The UI 500 can also be configured to surface network connection notifications to the user. For example, as shown, the user can choose to have notifications surfaced on the device when network connectivity changes 540 (e.g., changes in QoS, signal strength, network connection types, etc.), and when a preferred connection is not available 545 (e.g., WiFi is not available). The UI 500 can be further configured to solicit feedback from the user about the automated network connection selection and management features (not shown in FIG. 5). UI elements and controls can be exposed that enable the user to indicate satisfaction and dissatisfaction with various automated network connection management actions.

The UI can also allow the user to select multiple connections simultaneously 510 (e.g., Wi-Fi and cellular connections). This can provide the device with additional bandwidth and also additional options in determining an efficient network to utilize. If the UI is unselected, then a single connection may be utilized, such as only Wi-Fi or only cellular.

In an illustrative example, when the connection manager 230 executes a network connection management operation, the user can express a view of the success or failure of such operation in achieving the user's objectives through the UI. In addition, the user's actions can be used to implicitly infer success or failure of a given network connection management action. For example, if a particular automated action is taken to select a connection for a given application and the user manually overrides the selection to pick another network connection, then the user's action may be noted and utilized to refine the connection management methodology for future actions. The user feedback may be utilized to refine algorithms and methodologies utilized by the connection manager when selecting network connections for utilization for a given application and context.

Figure 6:
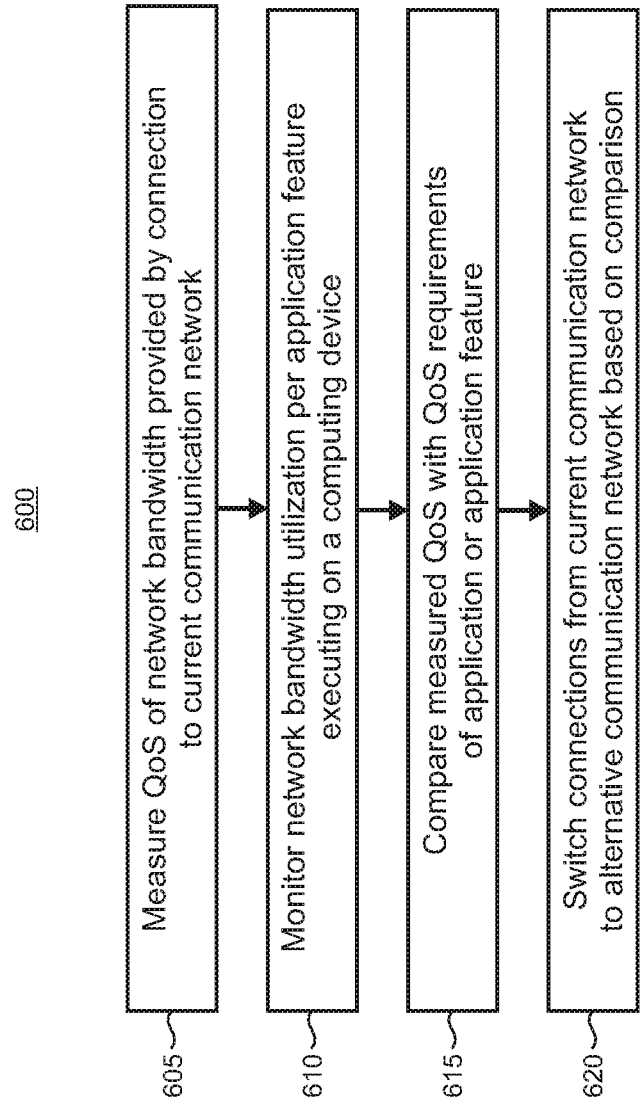
FIGS. 6, 7, and 8 show illustrative methods that may be performed when implementing the present intelligent connection management for multiple interfaces.

FIG. 6 is a flowchart of an illustrative method 600 that may be performed by a computing device 104. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At step 605, QoS is measured for a connection between a computing device and a current communication network. At step 610, network bandwidth utilization by each of one or more applications executing on the computing device is monitored. The monitoring can be performed on a per application feature basis, such that features associated with running applications can be monitored in addition to or alternatively to the individual application's performance overall. At step 615, the measured QoS is compared with QoS requirements of the application or application feature. At step 620, the connection to the current communication network is switched to an alternative communication network based on the comparison.

Figure 7:
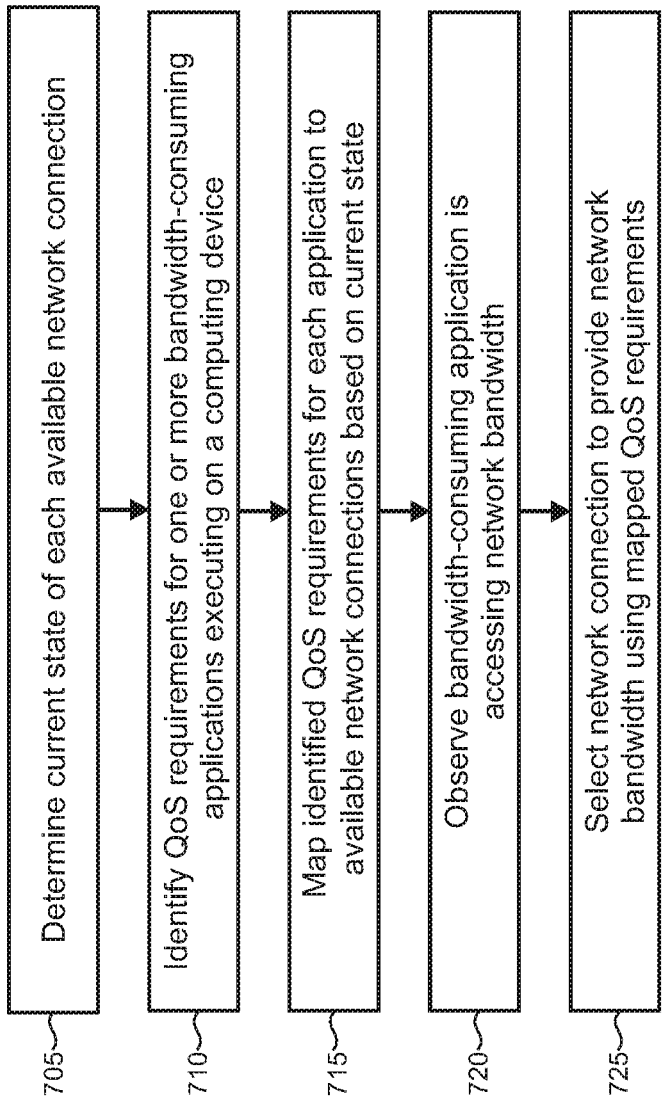

FIG. 7 is a flowchart of an illustrative method 700 that may be performed by a computing device 104. At step 705, a determination is made as to a current state of each available network connection at the computing device. At step 710, QoS requirements are determined for one or more bandwidth-consuming applications that are executing on the computing device. At step 715, the identified QoS requirements are mapped for each application to available network connections based on the current state. At step 720, observations are made that a bandwidth-consuming application is accessing network bandwidth. At step 725, a network connection is selected to provide the network bandwidth using the mapped QoS requirements.

Figure 8:
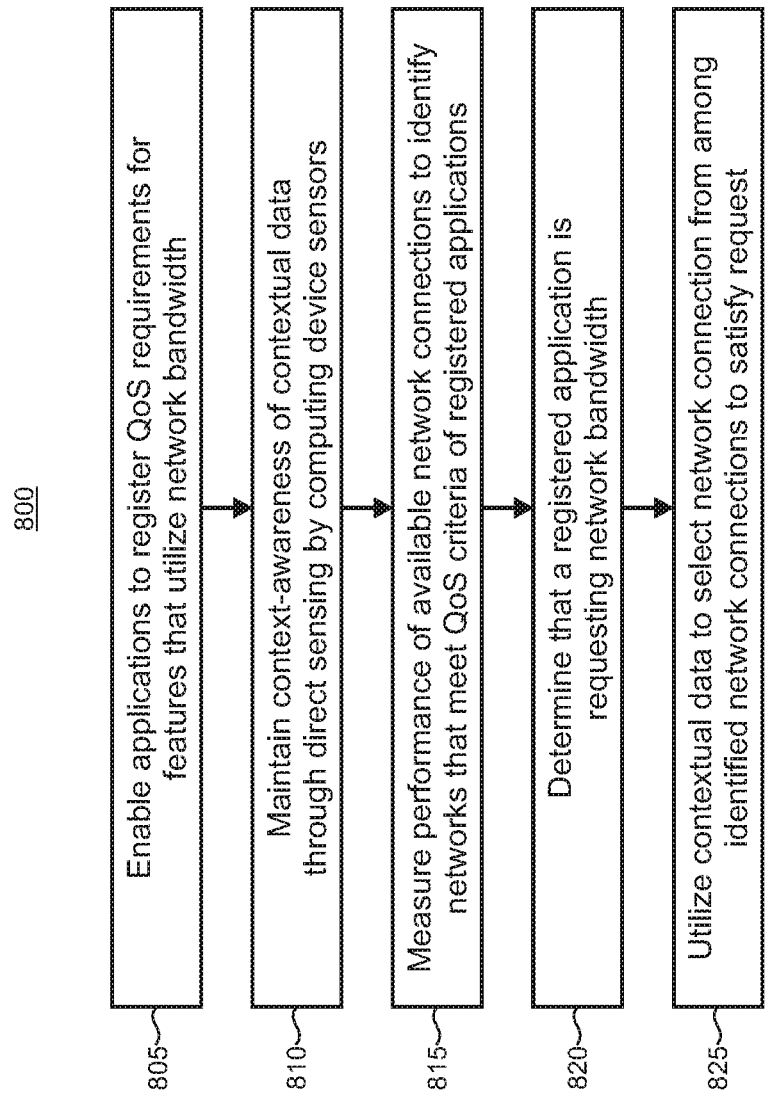

FIG. 8 is a flowchart of an illustrative method 800 that may be performed by a computing device 104. At step 805, applications are enabled to register QoS requirements for application features that utilize network bandwidth. At step 810, context-awareness of contextual data is maintained through direct sensing by computing device sensors. At step 815, performance of available network connections is measured to identify networks that meet QoS criteria of the registered applications. At step 820, a determination is made that an application is requesting network bandwidth. At step 825, the contextual data is utilized to select a network connection from among the identified connections to satisfy the network bandwidth request.

Figure 9:
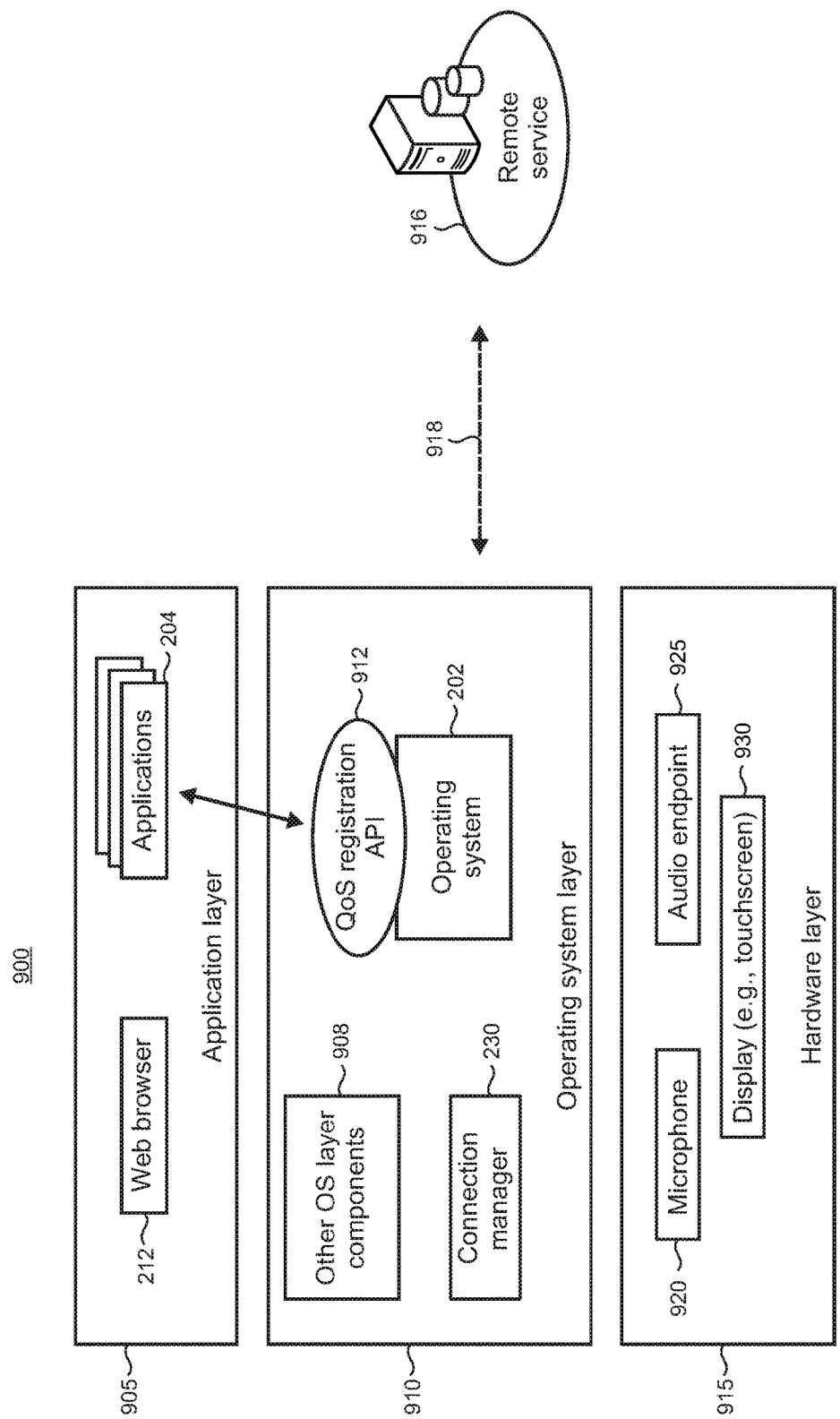
FIG. 9 shows an illustrative layered architecture.

FIG. 9 shows an illustrative layered architecture 900 that may be instantiated on a given device 104 (FIG. 1). The architecture 900 is typically implemented in software, although combinations of software, firmware, and/or hardware may also be utilized in some cases. The architecture 900 is arranged in layers and includes an application layer 905, an OS (operating system) layer 910, and a hardware layer 915. The hardware layer 915 provides an abstraction of the various hardware used by the device 104 (e.g., input and output devices, networking and radio hardware, etc.) to the layers above it. In this illustrative example, the hardware layer 915 supports a microphone 920, and an audio endpoint 925 which may include, for example, the device's internal speaker, a wired or wireless headset/earpiece, external speaker/device, and the like, and a display 930 such as a touchscreen. The illustrative hardware may be utilized, for example, to support interactions between the user and the device using the UI 500 shown in FIG. 5 and described in the accompanying text above.

The application layer 905 in this illustrative example supports the web browser 212 and various applications 204 including for example productivity, social, entertainment, finance, news and information applications, web applications, web services, and the like. The applications 204 are often implemented using locally executing code. However, in some cases, these applications can rely on services and/or remote code execution provided by remote servers or other computing platforms such as those supported by an application service, web service, service provider, or other cloud-based resources, for example as shown in FIG. 2 and described in the accompanying text above.

The OS layer 910 supports the operating system 202, connection manager 230, and various other OS components 908. In alternative implementations, the connection manager can be optionally instantiated as one or more components in the application layer 905. In some implementations, the OS 202 and/or connection manager 230 may interact with a remote service 916, as indicated by line 918. That is, the OS and connection manager in some implementations can partially utilize or fully utilize remote code execution supported at the service 916, or using other remote resources, for example, to obtain updates and data, and perform suitable actions to implement various functionalities thereof. In addition, the OS and/or connection manager may utilize and/or interact with the other OS components 908 (and/or other components that are instantiated in the other layers of the architecture 900) as may be needed to implement the various features and functions described herein. In some implementations, some or all of the functionalities by the components shown in the OS layer 910 can be incorporated into the OS 202 and the particular division of functionality between the components can be selected as a matter of design choice.

The OS 202 in this illustrative example supports a QoS registration API (application programming interface) 912 by which the applications 204 may register QoS requirements. The QoS requirements can vary by application feature and context. For example, a given application may need a higher QoS to support a real-time user experience relative to the QoS used to support background operations of the application. In another example, an application may vary its QoS requirements according to device location, time of day, and other contextual data.

Figure 10:
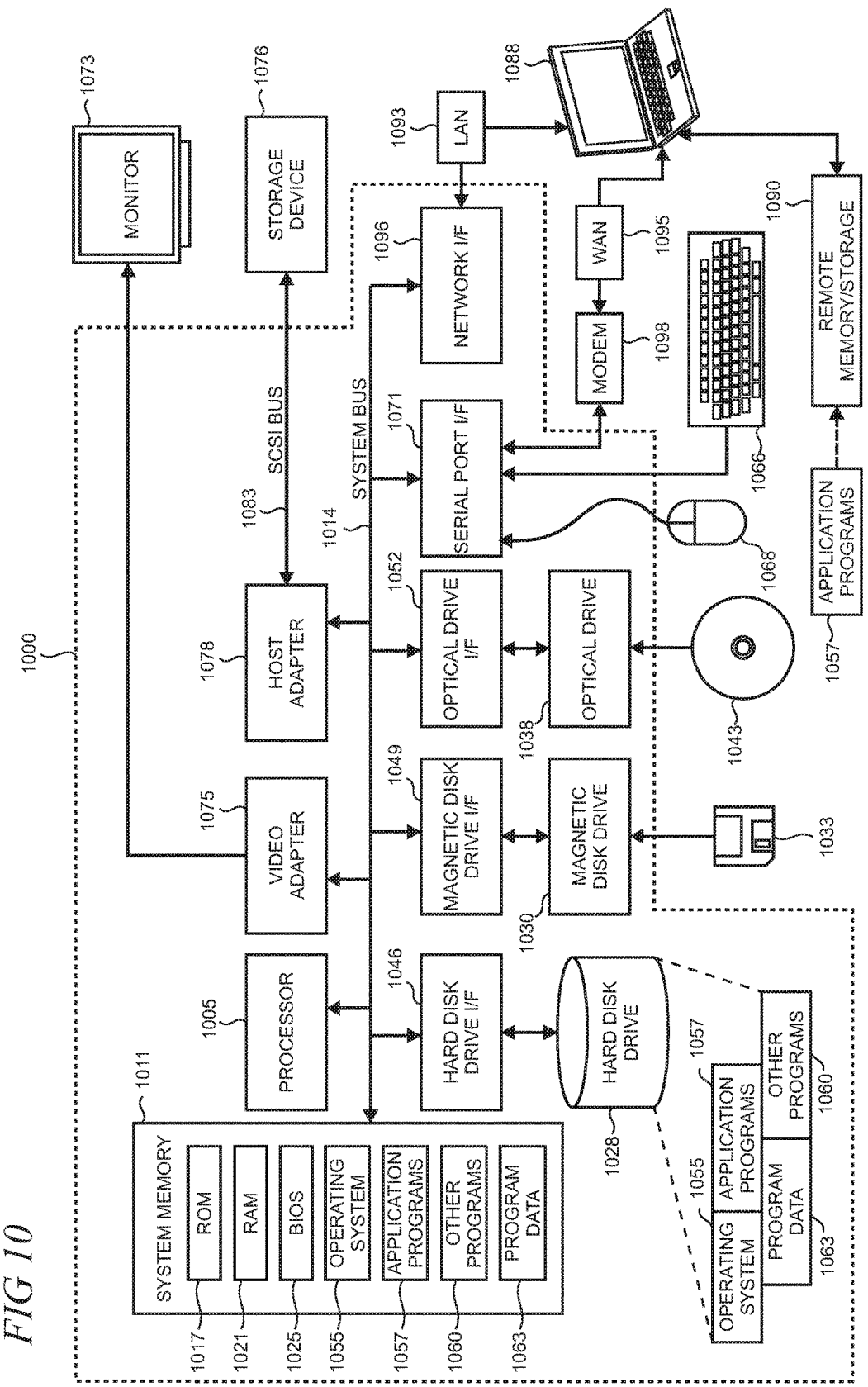
FIG. 10 is a simplified block diagram of an illustrative computer system such as a PC.

FIG. 10 is a simplified block diagram of an illustrative computer system 1000 such as a PC, client machine, or server with which the present intelligent connection management for multiple interfaces may be implemented. Computer system 1000 includes a processor 1005, a system memory 1011, and a system bus 1014 that couples various system components including the system memory 1011 to the processor 1005. The system bus 1014 may be any of several types of bus structures including a memory bus or memory controller, a peripheral bus, or a local bus using any of a variety of bus architectures. The system memory 1011 includes read only memory (ROM) 1017 and random access memory (RAM) 1021. A basic input/output system (BIOS) 1025, containing the basic routines that help to transfer information between elements within the computer system 1000, such as during startup, is stored in ROM 1017. The computer system 1000 may further include a hard disk drive 1028 for reading from and writing to an internally disposed hard disk (not shown), a magnetic disk drive 1030 for reading from or writing to a removable magnetic disk 1033 (e.g., a floppy disk), and an optical disk drive 1038 for reading from or writing to a removable optical disk 1043 such as a CD (compact disc), DVD (digital versatile disc), or other optical media. The hard disk drive 1028, magnetic disk drive 1030, and optical disk drive 1038 are connected to the system bus 1014 by a hard disk drive interface 1046, a magnetic disk drive interface 1049, and an optical drive interface 1052, respectively. The drives and their associated computer-readable storage media provide non-volatile storage of computer-readable instructions, data structures, program modules, and other data for the computer system 1000. Although this illustrative example includes a hard disk, a removable magnetic disk 1033, and a removable optical disk 1043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present intelligent connection management for multiple interfaces. In addition, as used herein, the term computer-readable storage media includes one or more instances of a media type (e.g., one or more magnetic disks, one or more CDs, etc.). For purposes of this specification and the claims, the phrase "computer-readable storage medium" and variations thereof are non-transitory, and do not include waves, signals, and/or other transitory and/or intangible communication media.

A number of program modules may be stored on the hard disk, magnetic disk 1033, optical disk 1043, ROM 1017, or RAM 1021, including an operating system 1055, one or more application programs 1057, other program modules 1060, and program data 1063. A user may enter commands and information into the computer system 1000 through input devices such as a keyboard 1066 and pointing device 1068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1005 through a serial port interface 1071 that is coupled to the system bus 1014, but may be connected by other interfaces, such as a parallel port, game port, or universal serial bus (USB). A monitor 1073 or other type of display device is also connected to the system bus 1014 via an interface, such as a video adapter 1075. In addition to the monitor 1073, personal computers typically include other peripheral output devices (not shown), such as speakers and printers. The illustrative example shown in FIG. 10 also includes a host adapter 1078, a Small Computer System Interface (SCSI) bus 1083, and an external storage device 1076 connected to the SCSI bus 1083.

The computer system 1000 is operable in a networked environment using logical connections to one or more remote computers, such as a remote computer 1088. The remote computer 1088 may be selected as another personal computer, a server, a router, a network PC, a peer device, or other common network node, and typically includes many or all of the elements described above relative to the computer system 1000, although only a single representative remote memory/storage device 1090 is shown in FIG. 10. The logical connections depicted in FIG. 10 include a local area network (LAN) 1093 and a wide area network (WAN) 1095. Such networking environments are often deployed, for example, in offices, enterprise-wide computer networks, intranets, and the Internet.

When used in a LAN networking environment, the computer system 1000 is connected to the local area network 1093 through a network interface or adapter 1096. When used in a WAN networking environment, the computer system 1000 typically includes a broadband modem 1098, network gateway, or other means for establishing communications over the wide area network 1095, such as the Internet. The broadband modem 1098, which may be internal or external, is connected to the system bus 1014 via a serial port interface 1071. In a networked environment, program modules related to the computer system 1000, or portions thereof, may be stored in the remote memory storage device 1090. It is noted that the network connections shown in FIG. 10 are illustrative and other means of establishing a communications link between the computers may be used depending on the specific requirements of an application of the present intelligent connection management for multiple interfaces.

Figure 11:
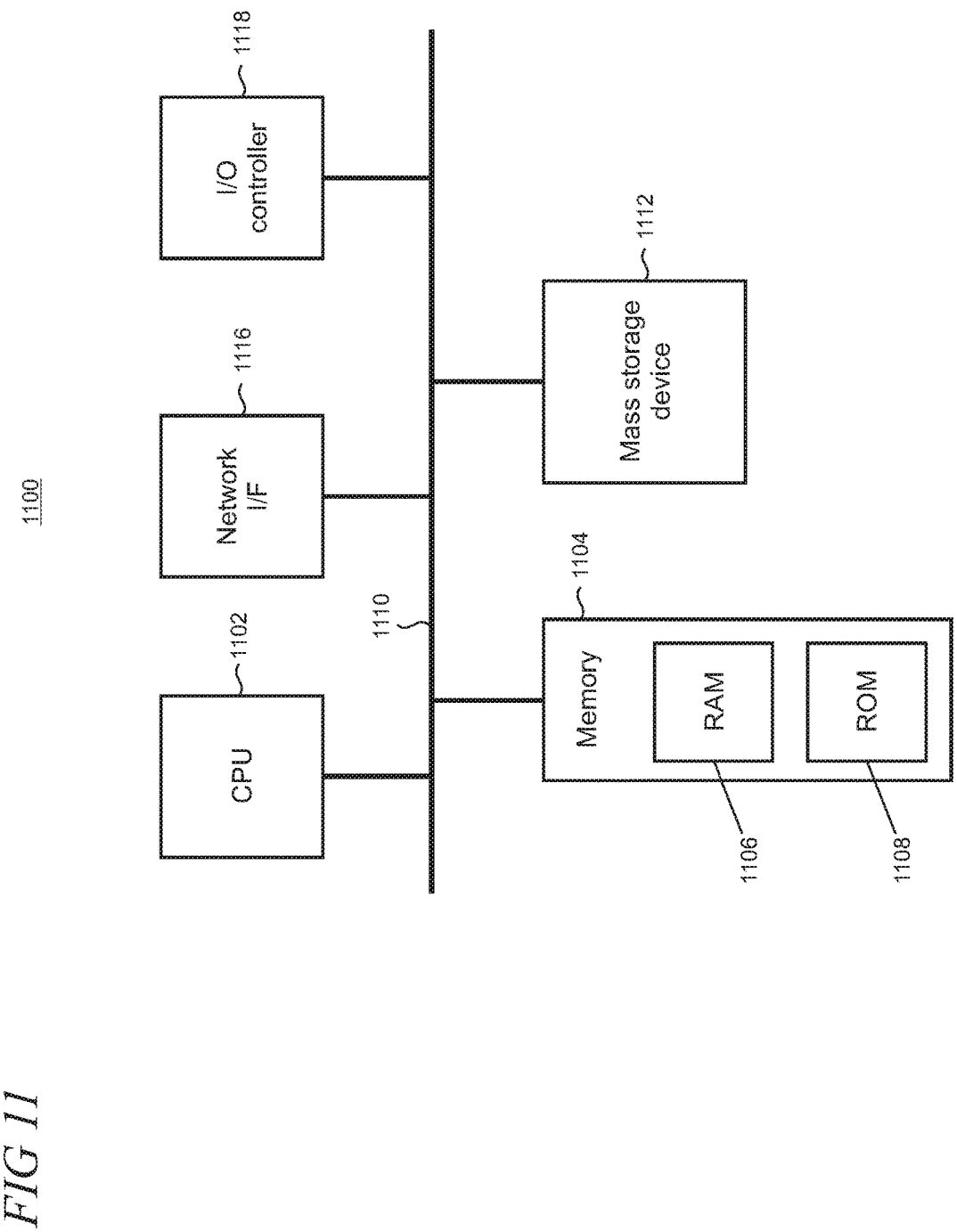
FIG. 11 shows an illustrative computer architecture capable of executing various components described herein for providing the present intelligent connection management for multiple interfaces.

FIG. 11 shows an illustrative computer architecture 1100 capable of executing the various components described herein for providing the present intelligent connection management for multiple interfaces. Thus, the architecture 1100 illustrated in FIG. 11 shows an architecture that may be adapted for a server computer, mobile phone, a PDA, a smartphone, a desktop computer, a netbook computer, a tablet computer, GPS device, gaming console, and/or a laptop computer. The architecture 1100 may be utilized to execute any aspect of the components presented herein.

The architecture 1100 illustrated in FIG. 11 includes a CPU (Central Processing Unit) 1102, a system memory 1104, including a RAM 1106 and a ROM 1108, and a system bus 1110 that couples the memory 1104 to the CPU 1102. A basic input/output system containing the basic routines that help to transfer information between elements within the architecture 1100, such as during startup, is stored in the ROM 1108. The architecture 1100 further includes a mass storage device 1112 for storing software code or other computer-executed code that is utilized to implement applications, the file system, and the operating system.

The mass storage device 1112 is connected to the CPU 1102 through a mass storage controller (not shown) connected to the bus 1110. The mass storage device 1112 and its associated computer-readable storage media provide non-volatile storage for the architecture 1100.

Although the description of computer-readable storage media contained herein refers to a mass storage device, such as a hard disk or CD-ROM drive, it may be appreciated by those skilled in the art that computer-readable storage media can be any available storage media that can be accessed by the architecture 1100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1100.

According to various embodiments, the architecture 1100 may operate in a networked environment using logical connections to remote computers through a network. The architecture 1100 may connect to the network through a network interface unit 1116 connected to the bus 1110. It may be appreciated that the network interface unit 1116 also may be utilized to connect to other types of networks and remote computer systems. The architecture 1100 also may include an input/output controller 1118 for receiving and processing input from a number of other devices, including a keyboard, mouse, or electronic stylus (not shown in FIG. 11). Similarly, the input/output controller 1118 may provide output to a display screen, a printer, or other type of output device (also not shown in FIG. 11).

It may be appreciated that the software components described herein may, when loaded into the CPU 1102 and executed, transform the CPU 1102 and the overall architecture 1100 from a general-purpose computing system into a special-purpose computing system customized to facilitate the functionality presented herein. The CPU 1102 may be constructed from any number of transistors or other discrete circuit elements, which may individually or collectively assume any number of states. More specifically, the CPU 1102 may operate as a finite-state machine, in response to executable instructions contained within the software modules disclosed herein. These computer-executable instructions may transform the CPU 1102 by specifying how the CPU 1102 transitions between states, thereby transforming the transistors or other discrete hardware elements constituting the CPU 1102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1100 in order to store and execute the software components presented herein. It also may be appreciated that the architecture 1100 may include other types of computing devices, including handheld computers, embedded computer systems, smartphones, PDAs, and other types of computing devices known to those skilled in the art. It is also contemplated that the architecture 1100 may not include all of the components shown in FIG. 11, may include other components that are not explicitly shown in FIG. 11, or may utilize an architecture completely different from that shown in FIG. 11.

Figure 12:
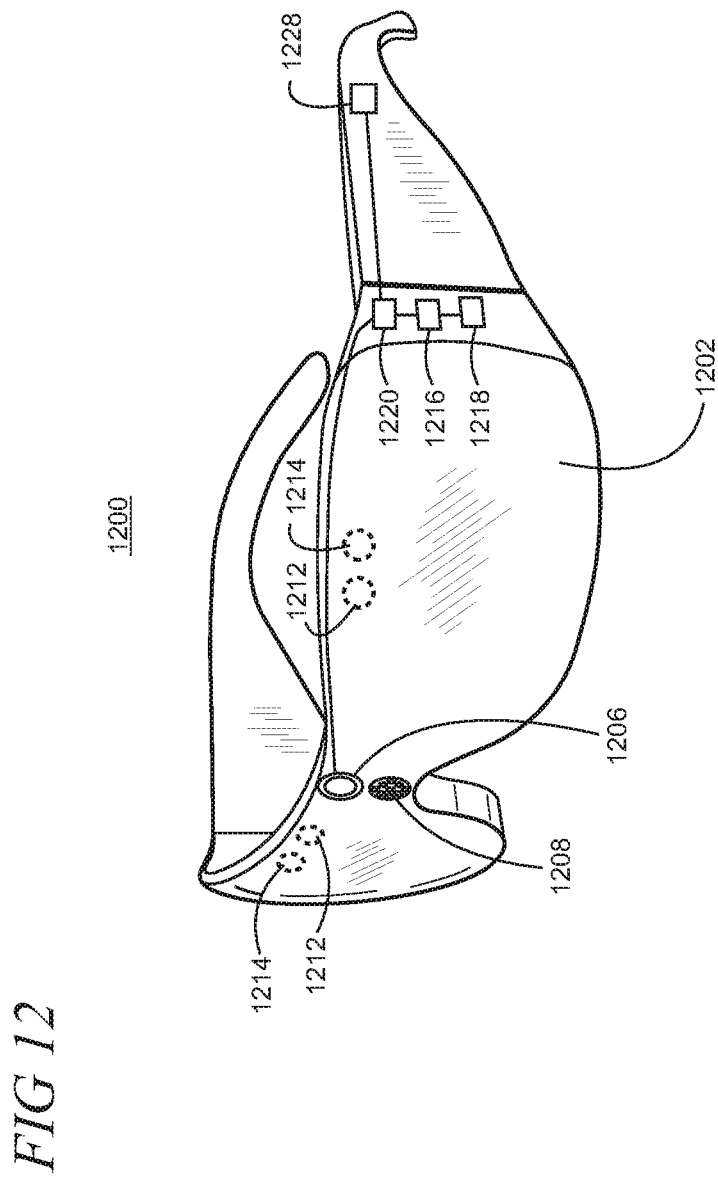
FIG. 12 is a pictorial view of an illustrative example of a virtual reality or mixed reality head mounted display (HMD) device.
Figure 13:
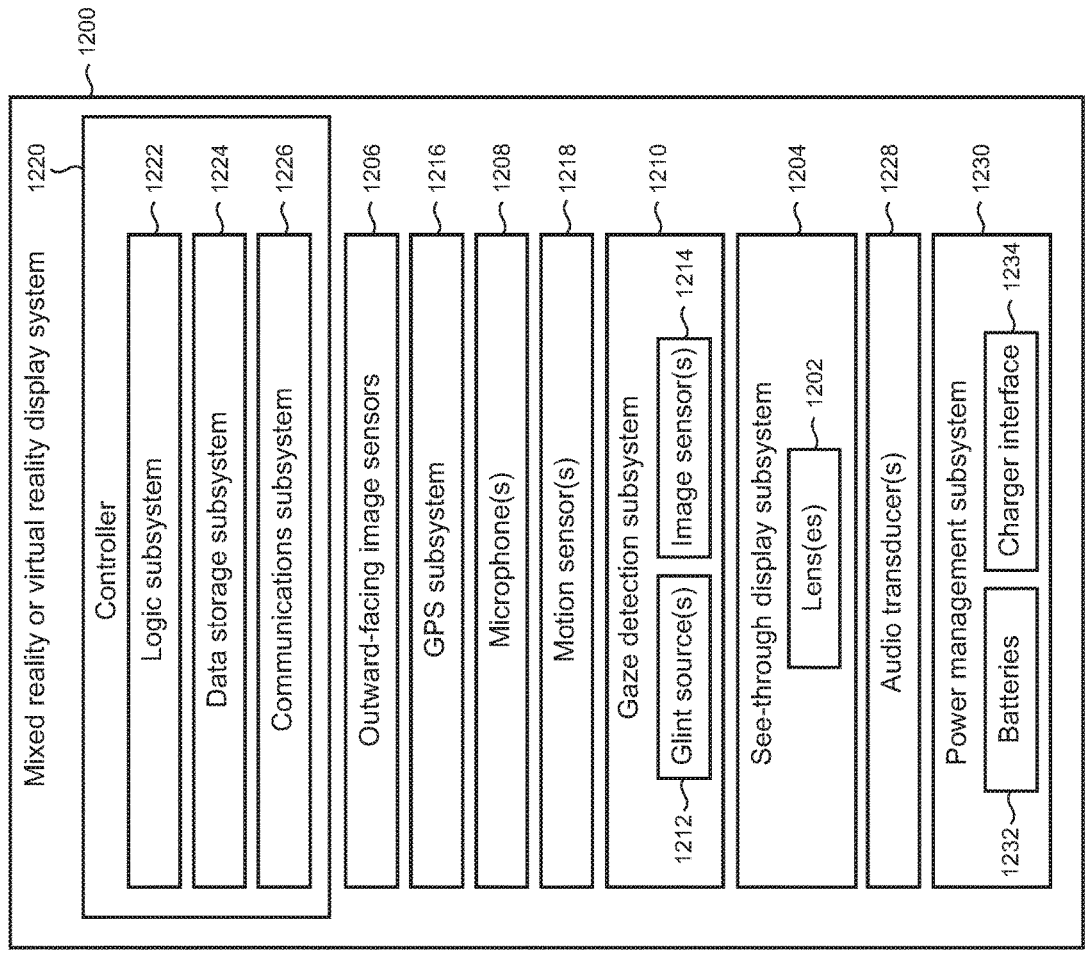
FIG. 13 shows a block diagram of an illustrative example of an augmented reality HMD device.

FIG. 12 shows one particular illustrative example of a see-through, augmented reality or virtual reality display system 1200, and FIG. 13 shows a functional block diagram of the system 1200. Display system 1200 comprises one or more lenses 1202 that form a part of a see-through display subsystem 1204, such that images may be displayed using lenses 1202 (e.g. using projection onto lenses 1202, one or more waveguide systems incorporated into the lenses 1202, and/or in any other suitable manner). Display system 1200 further comprises one or more outward-facing image sensors 1206 configured to acquire images of a background scene and/or physical environment being viewed by a user, and may include one or more microphones 1208 configured to detect sounds, such as voice commands from a user. Outward-facing image sensors 1206 may include one or more depth sensors and/or one or more two-dimensional image sensors. In alternative arrangements, as noted above, an augmented reality or virtual reality display system, instead of incorporating a see-through display subsystem, may display augmented reality or virtual reality images through a viewfinder mode for an outward-facing image sensor.

The display system 1200 may further include a gaze detection subsystem 1210 configured for detecting a direction of gaze of each eye of a user or a direction or location of focus, as described above. Gaze detection subsystem 1210 may be configured to determine gaze directions of each of a user's eyes in any suitable manner. For example, in the illustrative example shown, a gaze detection subsystem 1210 includes one or more glint sources 1212, such as infrared light sources, that are configured to cause a glint of light to reflect from each eyeball of a user, and one or more image sensors 1214, such as inward-facing sensors, that are configured to capture an image of each eyeball of the user. Changes in the glints from the user's eyeballs and/or a location of a user's pupil, as determined from image data gathered using the image sensor(s) 1214, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1210 may have any suitable number and arrangement of light sources and image sensors. In some implementations, the gaze detection subsystem 1210 may be omitted.

The display system 1200 may also include additional sensors. For example, display system 1200 may comprise a global positioning system (GPS) subsystem 1216 to allow a location of the display system 1200 to be determined. This may help to identify real-world objects, such as buildings, etc. that may be located in the user's adjoining physical environment.

The display system 1200 may further include one or more motion sensors 1218 (e.g., inertial, multi-axis gyroscopic, or acceleration sensors) to detect movement and position/orientation/pose of a user's head when the user is wearing the system as part of an augmented reality or virtual reality HMD device. Motion data may be used, potentially along with eye-tracking glint data and outward-facing image data, for gaze detection, as well as for image stabilization to help correct for blur in images from the outward-facing image sensor(s) 1206. The use of motion data may allow changes in gaze location to be tracked even if image data from outward-facing image sensor(s) 1206 cannot be resolved.

In addition, motion sensors 1218, as well as microphone(s) 1208 and gaze detection subsystem 1210, also may be employed as user input devices, such that a user may interact with the display system 1200 via gestures of the eye, neck and/or head, as well as via verbal commands in some cases. It may be understood that sensors illustrated in FIGS. 12 and 13 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1200 can further include a controller 1220 having a logic subsystem 1222 and a data storage subsystem 1224 in communication with the sensors, gaze detection subsystem 1210, display subsystem 1204, and/or other components through a communications subsystem 1226. The communications subsystem 1226 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1224 may include instructions stored thereon that are executable by logic subsystem 1222, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1200 is configured with one or more audio transducers 1228 (e.g., speakers, earphones, etc.) so that audio can be utilized as part of an augmented reality or virtual reality experience. A power management subsystem 1230 may include one or more batteries 1232 and/or protection circuit modules (PCMs) and an associated charger interface 1234 and/or remote power interface for supplying power to components in the display system 1200.

It may be appreciated that the display system 1200 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 14:
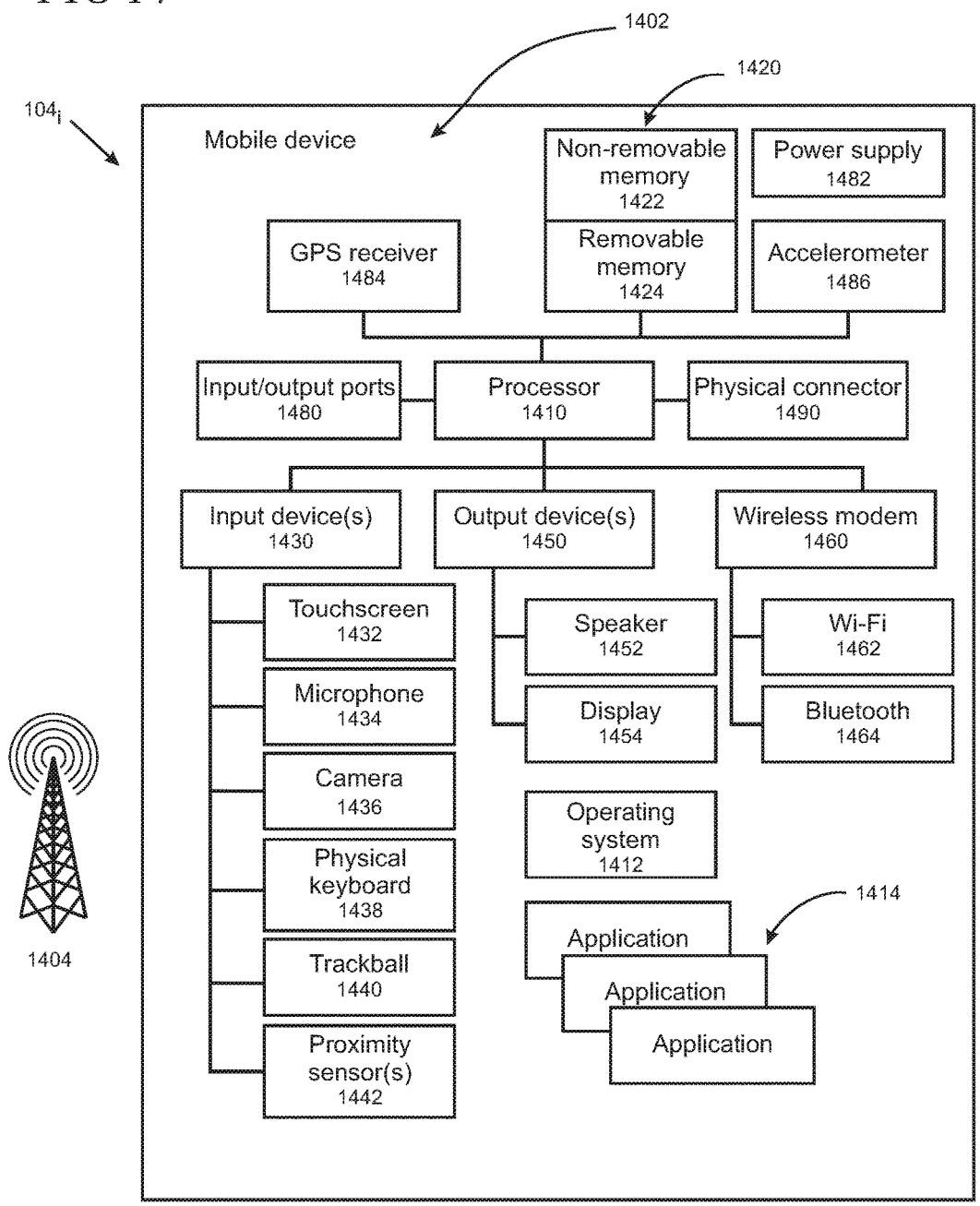
FIG. 14 is a block diagram of an illustrative computing device such as a mobile phone or smartphone.

FIG. 14 is a functional block diagram of an illustrative mobile device $104_i$ such as a mobile phone or smartphone including a variety of optional hardware and software components, shown generally at 1402. Any component 1402 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1404, such as a cellular or satellite network.

The illustrated mobile device $104_i$ can include a controller or processor 1410 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1412 can control the allocation and usage of the components 1402, including power states, above-lock states, and below-lock states, and provides support for one or more application programs 1414. The application programs can include common mobile computing applications (e.g., image-capture applications, email applications, calendars, contact managers, web browsers, messaging applications), or any other computing application.

The illustrated mobile device $104_i$ can include memory 1420. Memory 1420 can include non-removable memory 1422 and/or removable memory 1424. The non-removable memory 1422 can include RAM, ROM, Flash memory, a hard disk, or other well-known memory storage technologies. The removable memory 1424 can include Flash memory or a Subscriber Identity Module (SIM) card, which is well known in GSM (Global System for Mobile communications) systems, or other well-known memory storage technologies, such as "smart cards." The memory 1420 can be used for storing data and/or code for running the operating system 1412 and the application programs 1414. Example data can include web pages, text, images, sound files, video data, or other data sets to be sent to and/or received from one or more network servers or other devices via one or more wired or wireless networks.

The memory 1420 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device $104_i$.

The memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device $104_i$ can support one or more input devices 1430, such as a touchscreen 1432; microphone 1434 for implementation of voice input for voice recognition, voice commands and the like; camera 1436; physical keyboard 1438; trackball 1440; and/or proximity sensor 1442; and one or more output devices 1450, such as a speaker 1452 and one or more displays 1454. Other input devices (not shown) using gesture recognition may also be utilized in some cases. Other possible output devices (not shown) can include piezoelectric or haptic output devices. Some devices can serve more than one input/output function. For example, touchscreen 1432 and display 1454 can be combined into a single input/output device.

A wireless modem 1460 can be coupled to an antenna (not shown) and can support two-way communications between the processor 1410 and external devices, as is well understood in the art. The modem 1460 is shown generically and can include a cellular modem for communicating with the mobile communication network 1404 and/or other radio-based modems (e.g., Bluetooth 1464 or Wi-Fi 1462). The wireless modem 1460 is typically configured for communication with one or more cellular networks, such as a GSM network for data and voice communications within a single cellular network, between cellular networks, or between the device and a public switched telephone network (PSTN).

The device can further include at least one input/output port 1480, a power supply 1482, a satellite navigation system receiver 1484, such as a GPS receiver, an accelerometer 1486, a gyroscope (not shown), and/or a physical connector 1490, which can be a USB port, IEEE 1394 (FireWire) port, and/or an RS-232 port. The illustrated components 1402 are not required or all-inclusive, as any components can be deleted and other components can be added.

Various exemplary embodiments of the present intelligent connection management for multiple interfaces are now presented by way of illustration and not as an exhaustive list of all embodiments. An example includes one or more hardware-based computer-readable memory devices storing instructions which, when executed by one or more processors disposed in a computing device, cause the computing device to: measure Quality of Service (QoS) of network bandwidth provided by a connection between the computing device and a current communication network; monitor network bandwidth utilization by each of one or more applications executing on the computing device, the monitoring being performed per application feature; compare the measured QoS of the current communication network with QoS requirements for the application feature; and switch from the connection to the current communication network to a connection to an alternative communication network based on the comparison In another example, the instructions further cause the computing device to determine QoS requirements of the application and application feature, the determining including one of enabling registration of QoS requirements through an application programming interface, or inferring QoS requirements by observation of application or application feature operations under different network conditions. In another example, the instructions further cause the computing device to: monitor contextual data applicable to the computing device or applicable to a user of the computing device; generate a history of user interactions with the computing device; predict execution of an application or application feature using the monitored contextual data and user interaction history; and switch network connections based on the predicted execution of the application or application feature. In another example, the instructions further cause the computing device to surface a notification to the user about the network connection switching and receive feedback from the user about the network connection switching. In another example, the instructions further cause the computing device to observe application behaviors as QoS of networks vary and in which QoS requirements are estimated using the observations. In another example, the instructions further cause the computing device to categorize applications by type and switch among available network connections based on categorized types.

A further example includes a method for optimizing utilization of a plurality of network connections available on a computing device having a user interface configured for interacting with a user, comprising: determining a current state of each of the available network connections; identifying Quality of Service (QoS) requirements for one or more bandwidth-consuming applications executing on the computing device; mapping the identified QoS requirements for each application to the available network connections based on the current state; observing that a bandwidth-consuming application is accessing network bandwidth; and selecting a network connection to provide the network bandwidth using the mapped QoS requirements.

In another example, the QoS requirements are determined per application on a per-feature basis. In another example, a different network connection is selected to support a different feature provided by a bandwidth-consuming application. In another example, the method further includes measuring instrumentation to determine the current state of the available network connections. In another example, the executed instructions further cause the computing device to obtain user preferences for utilization of network connections and utilize the user preferences when performing the mapping. In another example, the QoS requirements are determined by iteratively testing each of the available connections with a bandwidth-consuming application, and observing application behaviors during each test. In another example, the observed application behaviors include one of disruption in rendered user experience, buffering of data over the tested network connection, or surfacing of a notification pertaining to network bandwidth. In another example, the QoS requirements are determined through an application programming interface over which the bandwidth-consuming applications register their respective QoS requirements.

A further example includes a computing device, comprising: one or more processors; a user interface configured to support interactions between the computing device and a user of the computing device; one or more sensors configured for sensing an environment surrounding the computing device; a plurality of network interfaces supporting respective network connections to different communication networks providing network bandwidth; and one or more hardware-based memory devices storing executable code associated with one or more network bandwidth-consuming applications and further storing computer-readable instructions which, when executed by the one or more processors, cause the computing device to enable applications executing on the computing device to register Quality of Service (QoS) criteria for application features that use network bandwidth; maintain context-awareness of contextual data through direct sensing by the one or more sensors, the contextual data describing interactions between the user, applications, and the surrounding environment; measure performance of available network connections to identify network connections that meet QoS criteria of registered applications; determine that a registered application is requesting network bandwidth, and utilize the contextual data to select a network connection from among the identified network connections to satisfy the network bandwidth request.

In another example, the contextual data describes an operational state of the computing device or a user behavior when interacting with the computing device, and in which the contextual data comprises one or more of time/date, location of the user or computing device, language, schedule, applications installed on the device, user preferences, user activities, stored contacts, call history, messaging history, browsing history, traffic conditions, application usage history, computing device type, computing device capabilities, or communication network type. In another example, the contextual data is obtained using the sensors on the computing device, the sensors including one or more of cameras, accelerometers, location-awareness components, thermometers, altimeters, heart rate sensors, human physiology sensors, barometers, microphones, or proximity sensors. In another example, the contextual data includes information obtained from one or more applications executing on the computing device. In another example, the measuring utilizes instrumentation adapted for determining one or more of bandwidth, packet loss, jitter, or latency. In another example, the one or more processors further cause the computing device to generate a history of user interactions with the computing device; predict execution of an application or application feature using the monitored contextual data and user interaction history; and switch network connections based on the predicted execution of the application or application feature.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. One or more hardware-based computer-readable memory devices storing instructions which, when executed by one or more processors disposed in a computing device, cause the computing device to:
    measure Quality of Service (QoS) of network bandwidth provided by a connection between the computing device and a current communication network;
    monitor network bandwidth utilization in real time by each of one or more applications executing on the computing device, the monitoring being performed for the one or more applications or per application feature for a respective application;
    compare the measured QoS of the current communication network with QoS requirements for an application or an application feature;
    switch from the connection to the current communication network to a connection to an alternative communication network based on the comparison; and
    observe application or application feature behaviors as QoS of networks vary, in which QoS requirements are estimated using at least the observations.

2. The one or more hardware-based computer-readable memory devices of claim 1 in which the instructions further cause the computing device to determine QoS requirements of the application and application feature, the determining including one of enabling registration of QoS requirements through an application programming interface, or inferring QoS requirements using the observed application or application feature behaviors under different network conditions.

3. The one or more hardware-based computer-readable memory devices of claim 1 in which the instructions further cause the computing device to:
    monitor contextual data applicable to the computing device or applicable to a user of the computing device;
    generate a history of user interactions with the computing device;
    predict execution of the application or the application feature using the monitored contextual data and user interaction history; and
    switch network connections based on the predicted execution of the application or application feature.

4. The one or more hardware-based computer-readable memory devices of claim 3, in which the instructions further cause the computing device to surface a notification to the user about the network connection switching and receive feedback from the user about the network connection switching.

5. The one or more hardware-based computer-readable memory devices of claim 1, in which the instructions further cause the computing device to categorize applications by type and switch among available network connections based on categorized types.

6. A method for optimizing utilization of a plurality of network connections available on a computing device having a user interface configured for interacting with a user, comprising:
    determining a current state of each available network connection;
    identifying Quality of Service (QoS) requirements for one or more bandwidth-consuming applications executing on the computing device;
    mapping the identified QoS requirements for each application to the available network connections based on the current state;
    observing that a bandwidth-consuming application is accessing network bandwidth;
    selecting a network connection to provide the network bandwidth using the mapped QoS requirements;
    monitoring real-time network bandwidth utilization by the bandwidth-consuming application with the selected network connection; and
    responsive to the bandwidth-consuming application's QoS requirements not being satisfied with the selected network connection according to the monitored real-time network bandwidth utilization, switching to a new available network connection.

7. The method of claim 6 in which the QoS requirements are determined per application on a per-feature basis, in which different features provided by a single application require differing QoS requirements.

8. The method of claim 7 in which a different network connection is selected to support a different feature provided by a bandwidth-consuming application.

9. The method of claim 6 further including measuring instrumentation to determine the current state of the available network connections.

10. The method of claim 6 further including obtaining user preferences for utilization of network connections and utilize the user preferences when performing the mapping.

11. The method of claim 6 in which the QoS requirements are determined by iteratively testing each of the available network connections with a bandwidth-consuming application, and observing application behaviors during each test.

12. The method of claim 11 in which the observed application behaviors include one of disruption in rendered user experience, buffering of data over the tested network connection, or surfacing of a notification pertaining to network bandwidth.

13. The method of claim 6 in which the QoS requirements are determined through an application programming interface over which the bandwidth-consuming applications register their respective QoS requirements.

14. A computing device, comprising:
    one or more processors;
    a user interface configured to support interactions between the computing device and a user of the computing device;
    one or more sensors configured for sensing an environment surrounding the computing device;
    a plurality of network interfaces supporting respective network connections to different communication networks providing network bandwidth; and
    one or more hardware-based memory devices storing executable code associated with one or more network bandwidth-consuming applications and further storing computer-readable instructions which, when executed by the one or more processors, cause the computing device to
        enable applications executing on the computing device to register Quality of Service (QoS) criteria for application features that use network bandwidth;
        maintain context-awareness of contextual data through direct sensing by the one or more sensors, the contextual data describing interactions between the user, applications, and the surrounding environment;

measure performance of available network connections to identify network connections that meet QoS criteria of registered applications;

determine that a registered application is requesting network bandwidth, and utilize the contextual data to select a network connection from among the identified network connections to satisfy the network bandwidth request.

15. The computing device of claim 14 in which the contextual data describes an operational state of the computing device or a user behavior when interacting with the computing device, and in which the contextual data comprises one or more of time/date, location of the user or computing device, language, schedule, applications installed on the device, user preferences, user activities, stored contacts, call history, messaging history, browsing history, traffic conditions, application usage history, computing device type, computing device capabilities, or communication network type.

16. The computing device of claim 14 in which the contextual data is obtained using the sensors on the computing device, the sensors including one or more of cameras, accelerometers, location-awareness components, thermometers, altimeters, heart rate sensors, human physiology sensors, barometers, microphones, or proximity sensors.

17. The computing device of claim 14 in which the contextual data includes information obtained from one or more applications executing on the computing device.

18. The computing device of claim 14 in which the measuring utilizes instrumentation adapted for determining one or more of bandwidth, packet loss, jitter, or latency.

19. The computing device of claim 14, in which the one or more processors further cause the computing device to generate a history of user interactions with the computing device;

predict execution of an application or application feature using the monitored contextual data and user interaction history; and switch network connections based on the predicted execution of the application or application feature.

* * * * *